United States Patent Office 3,513,151
Patented May 19, 1970

3,513,151
REACTION PRODUCT OF METAL OXIDES AND HYDROCARBYLCYCLOSILOXANES AND METHOD OF POLYMERIZATION USING SAME
Edgardo Santiago, Toledo, Ohio, assignor to Owens-Illinois, Inc., a corporation of Ohio
No Drawing. Filed Dec. 27, 1965, Ser. No. 516,715
Int. Cl. C08f 1/56, 3/06
U.S. Cl. 260—94.9
17 Claims

ABSTRACT OF THE DISCLOSURE

The specification discloses polymerization of olefinic hydrocarbons in the presence of a catalyst combination comprising the reaction product of a hydrocarbylcyclosiloxane with a transition metal oxide selected from Group IV, V, or VI and a reducing agent for such reaction product.

---

The present invention relates to a process for polymerizing olefins, to a novel catalyst composition and to the use of a new catalytic system for polymerizing olefins. This invention also relates to a process for the polymerization of ethylene. In particular, the invention relates to the use of a cyclic silylchromate, often in conjunction with a reducing agent as cocatalyst, to polymerize ethylene to a solid polymer.

The immediate invention also pertains to a catalytic system for polymerizing olefins. This catalytic system embodies the use of the product obtained from contacting a cyclosiloxane and a transition metal oxide in conjunction with a reducing agent as cocatalyst to polymerize olefins to high molecular weight solid polymers.

It is an object of this invention to provide a process for polymerizing olefins by using a silylchromate as the catalysts, often in conjunction with a reducing agent as a cocatalyst, to polymerize olefinic compounds to high molecular weight solid polymers.

It is a further object of this invention to provide a novel catalyst for olefin polymerization. The silicon-chromium catalysts of this invention can be prepared from cyclic silicon derivatives, such as the trimer, the tetramer of any other cyclic form of dihydrocarbylsilanols, although the former are now preferred.

It is another object of this invention to provide a new catalyst composition.

It is a further object of the invention to provide a new process for polymerizing aliphatic olefinic hydrocarbons, such as ethylene and 1,3-butadiene, to solid polymers using a catalyst, the main component of which is not highly sensitive to poisoning by water and is easily handled in the atmosphere.

According to the present invention there is provided a process for the polymerization of ethylene by contacting ethylene with a catalyst comprising the reaction product obtained by contacting a hexahydrocarbylcyclotrisiloxane or an octahydrocarbylcyclotetrasiloxane wherein each hydrocarbyl contains from 1 to 10 carbon atoms and a transition metal oxide such as chromium oxide. The reaction product obtained is often used in conjunction with a reducing agent, especially an organo-metallic reducing agent.

The silylchromate component of the catalyst is somewhat soluble in most organic solvents, and it is convenient to effect the polymerization of olefins while the silylchromate is at least partially dissolved in an inert diluent, the cocatalyst also being intimately dispersed or dissolved in the diluent. However, it is not necessary, in order to obtain polymerization of the monomer to a polymer, to employ a diluent or solvent.

The diluents that can be used in the process include aliphatic, cycloaliphatic, aromatic and halogenated hydrocarbons. Examples of suitable inert diluents that can be employed include organic solvents such as benzene, toluene, n-heptane, cyclohexane and carbon tetrachloride.

Examples of olefins are, broadly, organic monomers which contain an ethylenic linkage. The aliphatic olefinic hydrocarbons most preferred are olefins which contain 2 to 10 carbon atoms. In particular, ethylene can be polymerized to a polymer by contacting said ethylene with the catalytic system of this invention. Other examples of olefins are monoolefins such as propylene, butene-1, pentene-1, hexene-1, heptene-1, octene-1, and decene-1. As an example of branched chain olefins may be cited 3-methyl-butene-1, 4-methyl-pentene-1, 4,4-dimethyl-pentene-1, 3-ethyl-butene-1, 4,4-diethyl-hexene-1, 3,4-dimethyl-hexene-1, 4-butyl-1-octene and 5-ethyl-1-decene. Examples of di- and polyolefins include 1,3-butadiene, 1,5-hexadiene, 1,4-pentadiene, 1,4,7-octatriene, 2-methyl-1,3-butadiene and 1,4,6-trimethyl-1,5-hexadiene. Other olefinic compounds include styrene, vinylcyclohexane and allylbenzene.

Examples of hydrocarbyl groups in the cyclicsiloxanes are alkyl, alkenyl, cycloalkyl, aryl, alkaryl, and aralkyl, such as methyl, ethyl, propyl, isopropyl, butyl, isobutyl, tertiarybutyl, pentyl, hexyl, octyl, nonyl, decyl, allyl, butenyl, decenyl, phenyl, benzyl, phenylethyl, tolyl, xylyl, cyclohexyl, methylcyclohexyl and cyclopentyl.

Examples of the organometallic compound reducing agents include alkali metal alkyls or aryls such as amylsodium, butyllithium, phenylsodium, etc.; also such organo compounds of alkaline earth metals, earth metals, rare earth metals or zinc as dimethylmagnesium, diethylmagnesium, diethylzinc, phenylmagnesium, bromide, butylmagnesium chloride and the like. Especially useful are aluminum compounds, particularly triethylaluminum and tripropylaluminum. Other useful aluminum compounds include trioctylaluminum, triisobutylaluminum, triodecylaluminum, dimethylaluminum chloride, diethylaluminum bromide, diethylaluminum chloride, ethylaluminum dichloride, dipropylaluminum fluoride, diisobutylaluminum chloride, dipropylaluminum fluoride, diisobutylaluminum fluoride, ethylaluminum dihydride, diethylaluminum hydride, diisobutylaluminum hydride, etc. The now preferred organo-metallic reducing agent components of the catalyst composition are compounds of the formula $$AlR_nX_{(3-n)}$$

where R is an alkyl group containing 2 to 8 carbon atoms, X is a halogen having an atomic number from 17 to 35 and $n$ is an integer from 1 to 2.

As examples of transition metal oxides may be cited the oxides of transistion metals in Groups IV, V and VI of the Periodic Chart of Elements, especially titanium, molybdenum, zirconium and vanadium. The now preferred metal oxide is chromium trioxide.

Any amount of the reducing agent is effective to produce some polymerization in conjunction with the silylchromate, and the ratio of the chromium to the reducing agent can be varied widely, especially since a large excess of the reducing agent does not destroy the effectiveness of the catalyst combination for producing polymers.

The silylchromate catalyst of the present invention can be prepared, for example, by contacting finely divided chromium trioxide with the hydrocarbylcyclosiloxane in an inert solvent such as benzene, and allowing the chromium trioxide and the siloxane to react, suitably with agitation and at room temperature for a period of several hours. The resulting silylchromate dissolves in the solvent and any excess unreacted chromium trioxide is filtered from the solution. The solvent can then be evaporated under vacuum.

The following examples of the invention are merely illustrative and are not taken to be as limiting the invention in any manner.

EXAMPLE I

To a flask containing 100 milliliters of benzene were added with constant stirring 5.6 grams (0.025 m.) of hexamethylcyclotrisiloxane and 2.5 grams (0.025 m.) of anhydrous C.P. chromium trioxide. The above reagents were stirred together at room temperature and the reaction was left running over night for approximately 18 hours. After this period of time, the brownish red reaction mixture was filtered and the solid product was washed with benzene and allowed to dry at room temperature. The dried solid weighed 0.2 gram. The red benzene filtrate and washings were concentrated under vacuum on a hot water bath and the resulting brown gummy solid, which was used as the polymerization catalyst, weighed 7.8 grams.

EXAMPLE II

A round bottom glass flask was charged with 0.5 gram of the polymerization catalyst as prepared under Example I, 300 milliliters of n-heptane and 0.5 milliliter of diethylaluminum chloride, all materials being substantially dry and being charged in the order named. The mixture was heated to 135° F., at which time the system was pressurized with ethylene until a pressure of 20 p.s.i.g. was reached. Polymer formation was evident from the start. The ethylene was introduced for a period of two hours.

The polymer was purified by filtering, boiling with water containing HCl, further washing with water and then finally washing with acetone. The wet polymer was then dried over night in a vacuum oven at about 70° C. The recovered solid polyethylene weighed 17.6 grams.

The polymerization was repeated but substituting 0.5 milliliter of triethylaluminum for the 0.5 milliliter of diethylaluminum chloride. In this way, under the same conditions, about 0.3 gram of polyethylene was produced.

EXAMPLE III

To a flask containing 100 milliliters of benzene were added with constant stirring 6.0 grams (0.02 m.) of octamethylcyclotetrasiloxane and 2.0 grams (0.02 m.) of anhydrous C.P. chromium trioxide. The above reagents were stirred together at room temperature and the reaction was left running for approximately 18 hours. After this period of time the light yellow reaction mixture was filtered and the solid product was washed with benzene and allowed to dry at room temperature. The dried solid weighed 1.9 grams. The light yellow filtrate and washings were concentrated under vacuum. The resulting light brownish-yellow liquid weighed about 6.0 grams.

EXAMPLE IV

A round bottom glass flask was charged with 0.5 gram of the catalyst as prepared under Example III, 300 milliliters of n-heptane and 0.5 milliliter of diethylaluminum chloride, all materials being substantially dry and being charged in the order named. The mixture was heated to 135° F. at which time the system was pressurized with ethylene until a pressure of 20 p.s.i.g. was reached. Ethylene was introduced for two hours.

The polymer formed was purified by filtering with water containing HCl, further washing with water and then finally washing with acetone. The wet polymer was then dried over night in a vacuum oven at about 70° C. The recovered solid polyethylene weighed about 5.2 grams.

The polymerization described immediately above was repeated but 0.5 milliliter of triethylaluminum were used in place of 0.5 milliliter of diethylaluminum chloride. In this way, under the same conditions, trace quantities of polyethylene were produced.

EXAMPLE V

To a flask containing 300 milliliters of benzene were added with constant stirring 5.6 grams (0.025 m.) of hexamethylcyclotrisiloxane and 7.5 grams (0.075 m.) of anhydrous C.P. chromium trioxide. The above reagents were stirred together at room temperature and the reaction left running over night for approximately 18 hours. After this period of time, the reaction mixture was filtered and the solid product was washed with benzene and allowed to dry at room temperature. The unreacted chromium trioxide weighed 5.4 grams. The reddish-brown filtrate and washings were concentrated under vacuum on a hot water bath and viscous very dark liquid resulting weighed 8.0 grams.

EXAMPLE VI

A round bottom glass flask was charged with 0.5 gram of the polymerization catalyst of Example V, 300 milliliters of n-heptane and 0.5 milliliter of diethylaluminum chloride, all materials being charged in the order named. The mixture was heated to 135° F. at which time the system was pressurized with ethylene until a pressure of 20 p.s.i.g. was reached. The ethylene was introduced for a period of two hours and then discontinued.

The polymer was purified by filtering, boiling with water containing HCl, further washing with water and then finally washing with acetone. The wet polymer was dried over night in a vacuum at about 70° C. The recovered solid polyethylene weighed 16.5 grams.

The polymerization was repeated but 0.5 milliliter of triethylaluminum was substituted for the 0.5 milliliter of diethylaluminum chloride. In this way, under the same reaction, isolation and purification conditions, about 0.2 gram of polyethylene was produced.

The solid polymers produced according to the present invention are high molecular weight polymers such as polyethylene and are well known to be useful in many articles of commerce, notably for making bottles, bowls and the like by methods including injection and compression molding techniques. The solid diolefin polymers are vulcanizable elastomers, and can be compounded and vulcanized to make various objects, such as vehicle tires, in a well-known manner.

As will be evident to those skilled in the art, modifications of this invention can be made or followed in the light of the disclosure without departing from the spirit and scope of the disclosure or from the scope of the claims.

I claim:

1. A method for producing a material having utility as a catalyst in the polymerization of olefinic hydrocarbons, which comprises intimately contacting a member selected from the group consisting of hexahydrocarbylcyclotrisiloxane and octahydrocarbylcyclotetrasiloxane, wherein each hydrocarbyl group contains from 1 to 10 carbon atoms, with a transition metal oxide selected from Group IV, Group V and Group VI of the Periodic Chart and allowing the reaction to take place.

2. The method of claim 1 wherein the reactants are intimately contacted in about equal molar proportions.

3. The method of claim 1 wherein said metal oxide is $CrO_3$ and said hydrocarbyl group is methyl.

4. The method of claim 1 wherein said hydrocarbyl group is an alkyl group.

5. The method of claim 4 wherein said metal oxide is $CrO_3$.

6. The method of claim 1 wherein said hydrocarbylcyclotrisiloxane is hexamethylcyclotrisiloxane and said metal oxide is $CrO_3$, the molar ratio of these materials respectively being in the range of about 1:1 to 1:3.

7. A method which comprises intimately contacting hexamethylcyclotrisiloxane and chromium trioxide, said hexamethylcyclotrisiloxane and said chromium trioxide being present in the molar ratio of about 1:1 to about 1:3 respectively, allowing the reaction to take place, removing any residual solids from the resultant reaction mixture, and concentrating the remaining liquid phase to obtain a reaction product suitable for use in the polymerization of olefinic hydrocarbons.

8. A composition of matter comprising the reaction product of about equal molar proportions of $CrO_3$ and a member selected from the group consisting of hexaalkylcyclotrisiloxane and octaalkylcyclotetrasiloxane, wherein the alkyl group contains 1–10 carbon atoms.

9. A composition of matter comprising the reaction product of about equi-molar proportions of a transition metal oxide selected from Groups IV, V, VI of the Periodic Chart and a compound selected from the group consisting of hexahydrocarbylcyclotrisiloxane and octahydrocarbylcyclotetrasiloxane, wherein the hydrocarbyl group contains 1 to 10 carbon atoms.

10. The composition of claim 9 wherein said metal oxide is $CrO_3$ and said hydrocarbyl group is methyl.

11. A process for the polymerization of ethylene which comprises the steps of: (1) reacting $CrO_3$ and a member selected from the group consisting of hexamethylcyclotrisiloxane and octamethylcyclotetrasiloxane; and (2) contacting said ethylene until polymerization is effected with the product of the reaction of step (1) in the presence of an organo-metallic reducing agent selected from the group consisting of alkali metal alkyls, alkali metal aryls, organo compounds of alkaline earth metals, organo compounds of rare earth metals, organo compounds of zinc and a compound having the formula $AlR_nX_{(3-n)}$ wherein R is an alkyl group containing 2–8 carbon atoms, X is a halogen having an atomic member from 17 to 35 and $n$ is an integer from 1 to 2.

12. The process of claim 11 wherein said reducing agent is diethylaluminum chloride.

13. The process of claim 12 wherein said $CrO_3$ and said cyclosiloxanes are reacted in about equal molar proportions.

14. A process for the polymerization of an olefinic hydrocarbon containing 2–10 carbon atoms which comprises:
(A) forming a catalytic system by reacting a metal oxide selected from Group IV, V and VI of the Periodic Chart with a member selected from the group consisting of hexahydrocarbylcyclotrisiloxane and octahydrocarbylcyclotetrasiloxane wherein the hydrocarbyl group contains 1–10 carbon atoms, and adding a reducing agent to the reaction product of said metal oxide and said cyclosiloxane, said reducing agent having the formula $AlR_nX_{(3-n)}$ wherein R is alkyl of from 2 to 8 carbon atoms, X is a halogen having an atomic number from 17 to 35 and $n$ is an integer from 1 to 2;
(B) and contacting said olefinic hydrocarbon with the catalytic system of Step A until polymerization is effected.

15. The process of claim 14 wherein said olefinic hydrocarbon is ethylene.

16. The process of claim 15 wherein said metal oxide is $CrO_3$, said hydrocarbyl group is an alkyl and said reducing agent is diethylaluminum chloride.

17. The process of claim 16 wherein said alkyl is methyl.

References Cited

UNITED STATES PATENTS 3,324,101    6/1967    Baker et al. _____ 260—94.9

JOSEPH L. SCHOFER, Primary Examiner

E. J. SMITH, Assistant Examiner

U.S. Cl. X.R.

260—93.1, 93.5, 93.7, 94.3, 46.5; 252—431, 430

PO-1050
(5/69)

UNITED STATES PATENT OFFICE
CERTIFICATE OF CORRECTION

Patent No. 3,513,151                    Dated    May 19, 1970

Inventor(s)    Edgardo Santiago

It is certified that error appears in the above-identified patent
and that said Letters Patent are hereby corrected as shown below:

Column 6, line 14, after "from" and before "2" insert
- - about - - .

SIGNED AND
SEALED
AUG 25 1970

(SEAL)
Attest:

Edward M. Fletcher, Jr.
Attesting Officer

WILLIAM E. SCHUYLER, JR.
Commissioner of Patents